Nov. 13, 1923.
W. E. WILLIAMS
1,473,689
AUTOMOBILE BUMPER
Filed Feb. 8, 1922
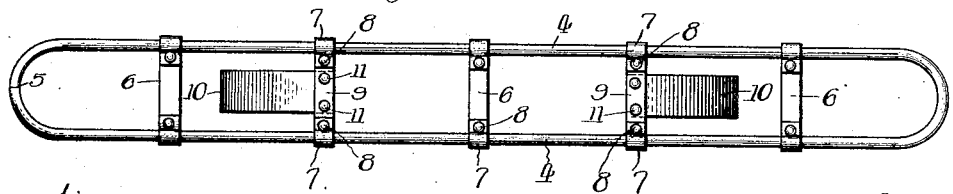
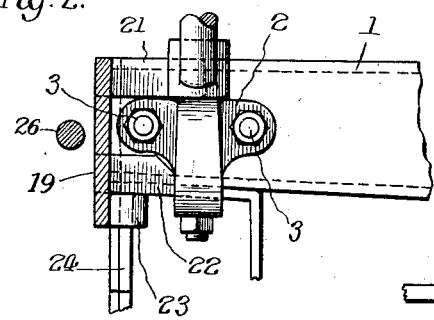
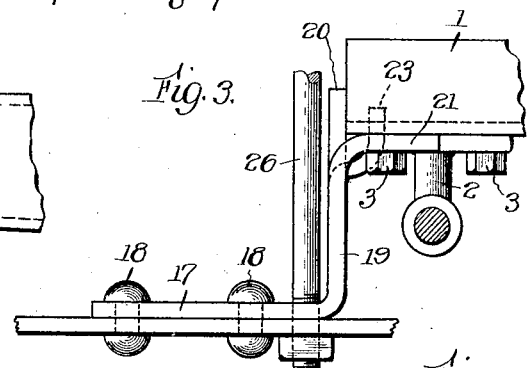
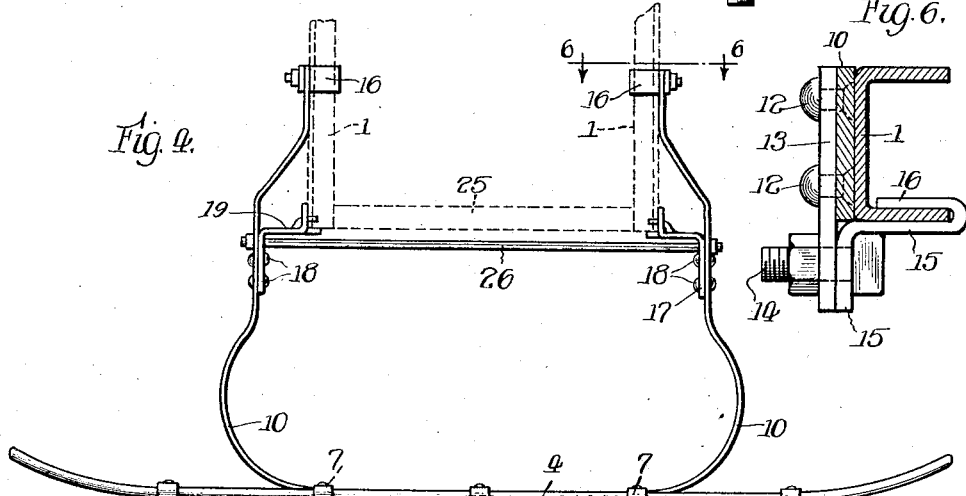
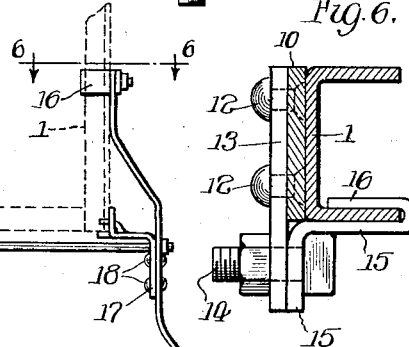
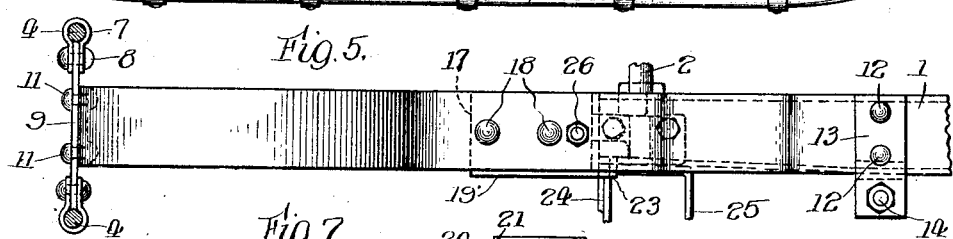
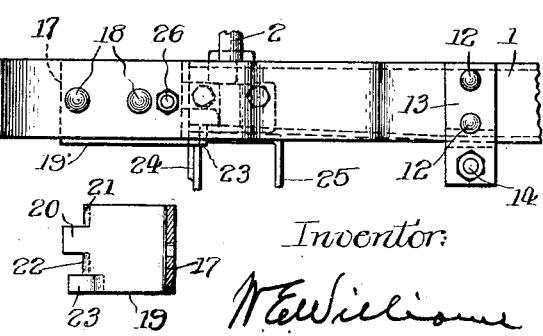
Witness:
A. J. Sauser.
Inventor:
W. E. Williams Patented Nov. 13, 1923.

1,473,689

UNITED STATES PATENT OFFICE.

WILLIAM ERASTUS WILLIAMS, OF WILMETTE, ILLINOIS.

AUTOMOBILE BUMPER.

Application filed February 8, 1922. Serial No. 535,053.

*To all whom it may concern:*

Be it known that I, WILLIAM ERASTUS WILLIAMS, a citizen of the United States, a resident of Wilmette, in the county of Cook and State of Illinois, have invented a new and useful Improvement in Automobile Bumpers, of which the following is a specification.

The object of my invention is to furnish a bumper that may be very easily and securely attached to some types of automobiles, to which bumpers have not heretofore been readily secured, and a further object is to furnish a strong, light and durable bumper and one that will permit ready access to the cranking devices of the car when desired, and a further object is to furnish a wide contact face, for the collision bar, which covers a wide vertical area and a wide horizontal area to protect the car fenders and to also furnish a sufficiently wide vertical contact surface to prevent telescoping of bumpers when accidents occur that bring two cars with bumpers in collision.

Reference will be had to the accompanying drawings in which Figure 1 is a front elevation of the bumper alone.

Figure 2 is a side sectional elevation of the front end of the frame of an automobile showing a part of my bumper in section.

Figure 3 is a plan detail of my bumper and connection and one end of the frame.

Figure 4 is a plan arrangement of the bumper and front end of the frame of an automobile.

Figure 5 is a side elevation partly in section of my bumper, looking in the same direction as in Figure 2.

Figure 6 is a sectional detail on line 6—6 of Figure 4. Figure 7 is a cross section of one of the brackets.

In the drawing 1 indicates the front end of the frame members of an automobile. 2 indicates the lamp bracket and bracket which supports the outer end of the fenders, which is secured to the frame of the automobile by small bolts 3. The lamp bracket I use as one of the features in holding my bumper to the frame of the car, using it only to resist the vertical displacement of my bumper as fastened to the frame but not making it the entire sustaining member for the bumper as is done in some types of bumper fastenings for this sort of a frame.

The buffer bar or collision bar I make of round rods formed into a loop and welded at one or both ends of this loop. The bars themselves are indicated by 4 and the weld by 5. This collision bar loop is made of tempered spring steel and serves the purpose of a spring bar to some extent, and because of its round surfaces it does not offer the wind resistance that is developed by a flat bar in a corresponding service, and it is also stronger than the same section of flat bar.

This collision bar loop is connected across by tie bars 6, at each end and the middle, and these tie bars are clamped to the rods 4 by means of the clips 7 and rivets 8. In addition to the cross bars 6, I provide the supporting cross bars 9 to which the spring arms 10 are connected. The spring arms 10 are connected to the cross bars 9 by bolts 11. Rivets may be used in place of bolts in some instances, as may be desired. The spring arms 10 are curved as shown and extend backward and terminate at a fastening to the frame, as indicated by Figure 6. The parts 10 at this rear or inward end are secured by rivets 12 to vertical parts 13, extending below the frame and carrying bolts 14, which pass through a clip 15, the latter having a turned over end 16, embracing the lower flanges of the frame pieces.

The spring arms 10 are provided with brackets 17 secured thereto by rivets 18 and these brackets have right angle sections 19 extending transversely across the front of the frame of the car. The inner ends of these right angle sections 19 are mutilated to produce a series of fingers longitudinally and transversely of the frame of the car. I have here shown these fingers as being forged from the slitted ends of the parts out of which the brackets themselves are made, but castings may be substituted if desired for this particular feature or form of the bracket. One finger 20 of this end of the bracket projects in front of the front end of the frame, and takes the direct horizontal head-on thrust strains. The top finger, indicated by 21, extends over the top of the lamp bracket 2, (see Figures 2 and 3) and rests on the top of this bracket, and thus supports the bracket against downward displacement. The finger 22, shown in Figures 2 and 7, extends under one of the lugs or wings of the lamp bracket 2 and thus becomes a positive resistance to the upward movement of the bracket on the frame 1. The fingers 23 extend inside of the flanges 24 of the forward cross member 25 of the frame, the latter being shown in dotted lines in Figure 4. Thus the fingers 23 hold the bracket against movement forward off from the frame.

The tie cross rod 26 binds the two brackets 17 with their spring arms 10, snugly to the frame and thus secures the bumper to the frame, with the least possible trouble in fastening such a device to such a frame, and without requiring drilling or fitting of any special features to the frame itself, which is a great desideratum.

One feature of bumpers of this class, fastened to frames of this type, is that the overhang of the collision bar extending so far forward of the frame itself produces serious vibratory strains upon the fastenings to the frame of the car. This vibration has the effect of jarring loose the fastenings that are made for this sort of a device. The ordinary lamp bracket 2 of the car, is built by the maker only to withstand the service designed as a lamp bracket and a fender support and it is not desirable to put any more load upon this part of the frame.

The engagement of the frame by the fingers and the action of the rod 26 hold the bracket 17 securely under all normal strains and it is only for registry that the fingers 21 and 32 embrace this bracket 2, or in case the rod 26 is not set up tightly, then the fingers 21 and 22 may of necessity have to transmit shearing strains to the bolts 3, but in a normal fastening of the device, it is intended that the frictional bearing on the frame will take the major part of the load and thus not put upon any part of the automobile frame loads that are beyond the service that those parts may be reasonably expected to furnish, regardless of whether or not they form a part of the bumper attachment.

What I claim is:—

1. The combination with an automobile frame, of an endless steel rod forming an elongated bumper bar loop with its upper and lower members in approximately the same vertical plane, connected in their central region by crossbars and having their end portions bent toward the frame, supporting flat spring arms each having one end connected to said region of the loop and its opposite end clamped to said frame at some distance from its end, brackets interposed between said end and said arms, respectively, and a rod rigidly binding the arms and brackets to the end portion of the frame.

2. The combination with a vehicle frame, of a bumper bar, spring arms connected to the bar and extending, respectively, along opposite sides of the frame and terminally and detachably fixed thereto, brackets between said arms and the corners of the frame, respectively, and a rod passing across the end of the frame and binding the arms and brackets to the sides of the frame.

3. The combination with a common channel-bar vehicle frame, of a bumper bar, spring arms connected to the bar and extending along the sides of the frame, respectively, brackets securing the ends of the arms to the frame at some distance from its end, and other brackets having rigid fingers and movable horizontally into detachable engagement with upper, lower, forward and rearward faces of the channel frame at its corners, and means for compelling and maintaining such engagement.

4. The combination with an automobile frame, of laterally curved spring arms each projecting beyond the end of the frame and secured at its own end to the frame, a second bracket at the frame's end, and a rod drawing the arms and corresponding second brackets into rigid engagement with the frame's sides.

5. The combination with an automobile frame, of a transverse collision bar spaced from the end of the frame, spring arms for supporting the bar in position, brackets having parts adapted to engage both side and end faces of the frame, and a transverse rod clamping said spring arms and brackets together and detachably binding said bracket parts in engagement with said faces.

6. The combination with a channel-bar automobile frame of spring arms overlapping the sides of said frame, respectively, clips clamping the ends of the bars to the sides of the frame, respectively, brackets each having rigid portions arranged to move laterally into and out of engagement with front, rear, upper, and lower faces of the corresponding corners of the frame, and a transverse bolt-like rod detachably binding the bars to the brackets and the latter in engagement with the frame.

Signed at Chicago, in the county of Cook and State of Illinois, this 30th day of January, 1922.

WILLIAM ERASTUS WILLIAMS.

Witnesses:
F. ZOBEL,
JOS. E. LOVE.